United States Patent [19]

Goldner

[11] Patent Number: 5,184,195
[45] Date of Patent: Feb. 2, 1993

[54] TRIAXIAL FIBER OPTIC SAGNAC INTERFEROMETER WITH SINGLE SOURCE AND DETECTOR

[75] Inventor: Eric L. Goldner, Valencia, Calif.

[73] Assignee: Litton Systems, Inc., Woodland Hills, Calif.

[21] Appl. No.: 705,762

[22] Filed: May 28, 1991

[51] Int. Cl.⁵ .............................................. G01C 19/72
[52] U.S. Cl. ................................................ 356/350
[58] Field of Search ................................... 356/350

[56] References Cited

U.S. PATENT DOCUMENTS 4,588,296  5/1986  Cahill et al. .................. 356/350
4,828,389  5/1989  Gubbins et al. ............... 356/350

FOREIGN PATENT DOCUMENTS 3001721  7/1981  Fed. Rep. of Germany ...... 356/350

Primary Examiner—Samuel A. Turner
Attorney, Agent, or Firm—Elliott N. Kramsky

[57] ABSTRACT

A triaxial Sagnac interferometer employs a single source of optical energy and a single photodetector. An optical fiber network interconnects the source and the photodetector with three fiber optic gyroscopes. A phase modulator is associated with each of the gyroscopes for applying a phase difference bias. The modulators are controlled by a common control circuit. The outputs of the modulators are divided into three distinct modes. During any one mode, two of the three gyroscopes are blanked so that the composite output comprises a readily interpreted serial presentation of individual gyroscope data.

9 Claims, 3 Drawing Sheets

TRIAXIAL FIBER OPTIC SAGNAC INTERFEROMETER WITH SINGLE SOURCE AND DETECTOR

BACKGROUND

1. Field of the Invention

The present invention relates to apparatus for measuring rotation. More particularly, this invention pertains to a fiber optic Sagnac interferometer for measuring rotation rates about three axes in space that requires only a single source of optical energy and a single photodetector.

2. Description of the Prior Art

The Sagnac interferometer is an instrument for determining rotation rate through measurement of the nonreciprocal phase difference generated between a pair of counterpropagating light waves. This instrument generally comprises a light source such as a laser, an optical waveguide consisting of several mirrors or a plurality of turns of optical fiber, a beam splitter/combiner, a detector and a signal processor.

In an interferometer, the waves leaving the beam splitter counterpropagate along a common optical path. The optical waveguide is "reciprocal"; that is, any distortion of the optical path affects the counterpropagating beams similarly although they do not necessarily experience such perturbation at the same time or in the same direction. Time-varying perturbations may be observed where the time interval is comparable to the propagation time of the light around the optical waveguide. These "nonreciprocal" perturbations affect the counterpropagating beams differently and according to the direction of propagation. Such nonreciprocal perturbations are occasioned by physical effects that disrupt the symmetry of the optical medium in which the two waves propagate.

Two of the nonreciprocal effects are quite well known. The Faraday, or collinear magneto-optic effect, occurs when a magnetic field creates a preferential spin orientation of the electrons in an optical material whereas the Sagnac, or inertial relativistic effect, occurs when rotation of the interferometer with respect to an inertial frame breaks the symmetry of propagation time. Such latter effect is utilized as the principle of operation of a ring gyroscope.

Many applications, including navigation, require rotation and position information with respect to the three orthogonal space axes. Accordingly, a triad of interferometers may be required, one for sensing rotation about each of the rotation axes. In the past, systems of this type have employed three independent interferometers. That is, each interferometer has utilized a single dedicated source of optical energy and a single photodetector. As a result, a total of three sources of optical energy and three photodetectors have been required. The use of multiple sources of optical energy and photodetectors adds significantly to the weight, power consumption, heat dissipation and cost of an overall navigation system. Also, a control circuit is required for each source, further adding to size, heat and power consumption problems.

SUMMARY OF THE INVENTION

The present invention addresses the aforesaid shortcomings of the prior art by providing a triaxial fiber optic Sagnac interferometer for measuring rotation rates about three axes. The interferometer includes a source of optical energy. A first, a second and a third gyroscope is provided for measuring rotation rates about a first, a second and a third axis respectively.

Each of the gyroscopes comprises a coil of optical fiber. Means are provided for launching the optical energy into each of the loops as counterpropagating waves. Means are additionally provided in each of the coils for artificially modulating the phase difference between the counterpropagating beams. A single detector receives the output of each of the gyroscopes.

An optical network is provided for receiving the output of the source of optical energy, distributing such output to the gyroscopes, receiving the output of such gyroscopes and transmitting such output to the common detector. Finally, means are provided for driving the phase modulators so that the outputs of the gyroscopes are distinguishable at said detector.

The foregoing features and advantages of the present invention will become further apparent from the detailed description that follows. Such description is accompanied by a set of drawing figures. Numerals of the drawing figures, corresponding to numerals of the written description, point to the various features of the invention, like numerals referring to like features throughout both the written description and the drawing figures.

DETAILED DESCRIPTION

Figure 1:
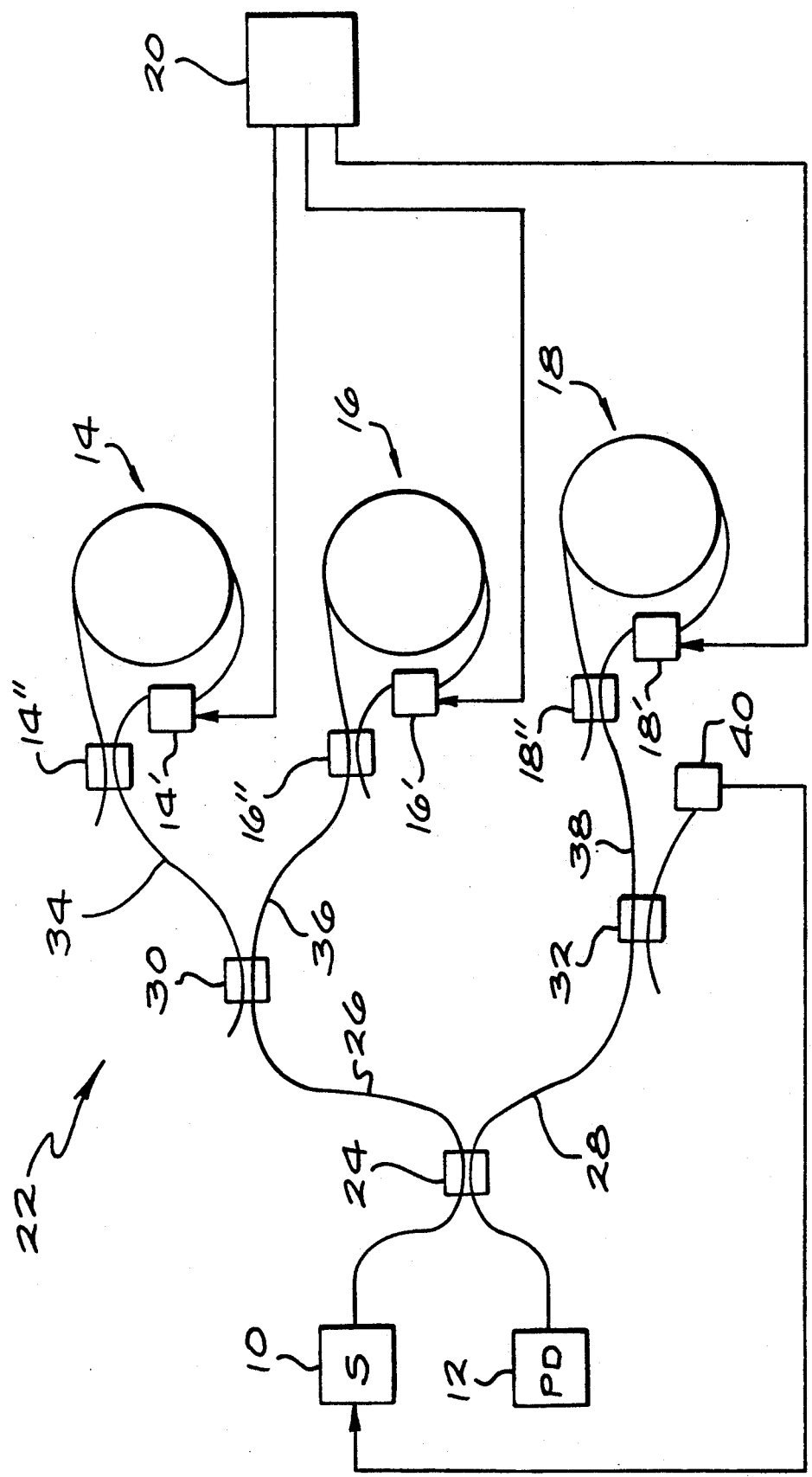
FIG. 1 is a schematic diagram of a triaxial fiber optic interferometer in accordance with the invention.

Turning to the drawings, FIG. 1 is a schematic diagram of a triaxial fiber optic interferometer in accordance with the invention. In the invention, a novel arrangement of three interferometric fiber optic gyros, coupled with a novel scheme for modulating the three gyro signals, produces an inexpensive device that is entirely acceptable for relatively low accuracy applications.

The interferometer requires only a single source 10 of optical energy and a single photodetector 12 for activating and receiving the outputs of the fiber optic gyroscopes 14, 16 and 18. Each of the gyro coils is physically oriented to measure rotation about one of the three space axes.

Phase modulators, each indicated by the corresponding primed numeral, are located near one end of each of the fiber coils comprising a gyroscope. The three phase modulators 14', 16' and 18' are driven by a common command circuit 20. It will be seen infra that the command circuit 20 provides a properly-sequenced series of signals to the phase modulators 14', 16' and 18' for assuring that the outputs of the three gyroscopes 14, 16 and 18 are readily distinguishable at the single photodetector 12.

A fiber optic network 22 provides optical communication between the source 10, the photodetector 12 and the gyroscopes 14, 16 and 18 to enable a single source and photodetector to provide the entire optical input and to receive the output of the triaxial interferometer arrangement. As mentioned earlier, the sequencing of the phase modulators 14', 16' and 18' by means of the command circuit 20 assures that the combined output received at the photodetector 12 is distinguishable so that the outputs of the three gyroscopes can be separately analyzed.

The network 22 includes a first bidirectional coupler 24 for splitting the output of the source 10 between the optical waveguides 26 and 28 (transmitting mode) and for combining the signals in those waveguides into a single composite output for application to the photodetector 12 (receiving mode).

Similarly, a secondary level of bidirectional couplers 30 and 32 receives the output from the source 10 via the waveguides 26 and 28 and splits those optical signals, directing them through the waveguides 34, 36 and 38 to the gyroscopes 14, 16 and 18 respectively. In addition, the coupler 32 may provide an output to a source monitor 40 for regulating the power of the source of optical energy 10.

The bidirectional coupler 30 combines the outputs of the gyroscopes 14 and 16 that are transmitted through the waveguides 34 and 36 respectively to deliver a composite signal comprising the outputs of the two gyroscopes to the waveguide 26. As will be seen, the signals representing the outputs of the gyroscopes 14 and 16 are synchronized with each other and with the output of the gyroscope 18 that is input to the waveguide 28 through the bidirectional coupler 32. The synchronization of gyro outputs is accomplished by means of the common command circuit 20. Additionally, the modulation scheme employed enables ready discrimination of the gyro outputs at the single photodetector 12.

A tertiary level bidirectional coupler is associated with each of the individual gyroscopes for launching counterpropagating waves into the gyroscope coils and for coherently combining the counterpropagating waves after a single traverse of the gyro loop to create a measurable gyro output. Each of the tertiary level bidirectional couplers is indicated by a double primed numeral corresponding to the associated gyroscope.

The output of an individual gyroscope comprises a "combined" beam. That is, the output of an individual gyroscope is proportional to the relative phase shift between the two counterpropagating waves after one complete traverse of the gyroscope coil. The rate of rotation about the gyroscope's sensitive axis is proportional to the phase shift that occurs between the counterpropagating waves. Accordingly, the accurate measurement of such phase shift is essential.

Figure 2:
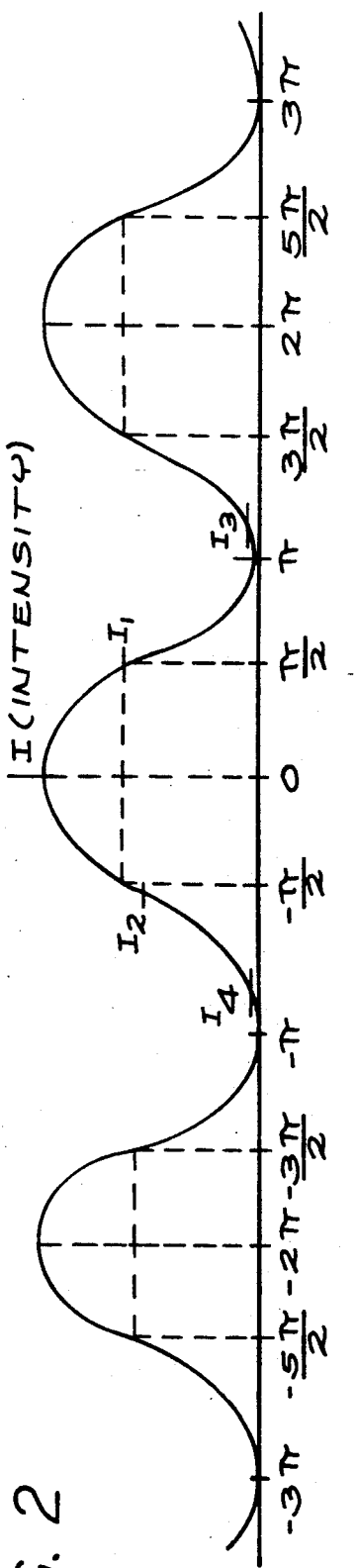
FIG. 2 is a graph of the relationship between the intensity of the output (combined) beam and the phase difference between the counterpropagating (component) beams in a Sagnac interferometer.

FIG. 2 is a graph that illustrates the relationship between the intensity of the combined (output) beam and the phase difference between the counterpropagating waves that form the combined beam. The transfer function of FIG. 2 consists of two components, one d.c. component and one proportional to the cosine of the phase difference between the counterpropagating waves. This phase difference between the waves provides a measure of the nonreciprocal perturbation due, for example, to the rotation of the gyroscope As a consequence of the character of the transfer function, when small phase differences are to be measured (e.g. low rotation rates), the intensity of the combined beam is relatively insensitive to phase difference since the phase difference is close to an intensity maximum. Furthermore, knowledge of the intensity of the composite wave is inadequate to provide an indication of the sense or direction of rotation.

For the foregoing reasons, an artificially biased phase difference is commonly superimposed upon the counterpropagating beams by means of the phase modulators 14', 16' and 18' associated with the gyroscopes 14, 16 and 18 respectively. This biasing of the phase shift, also known as a "nonreciprocal null-shift" enhances the sensitivity of the intensity measurement to phase differences. A maximum degree of sensitivity is achieved by shifting the operating point of the gyroscope to $\pm \pi/2$. Furthermore, by alternating the bias between $+\pi/2$ and $-\pi/2$, two different operating points are observed, enabling the system to resolve any ambiguity with regard to the sign of the phase difference and, thus, the direction of rotation.

It can be additionally observed in FIG. 2 that an output of minimal intensity occurs when a phase difference that is an integral odd multiple of $\pi$ radians exists between the counterpropagating beams. This is due to the purely destructive interference that takes place between the counterpropagating component wave at that value. Furthermore, the minima and maxima of the transfer function that occur at integral multiples of $\pi$ produce regions of minimal sensitivity of beam intensity to phase differences.

Figure 3A:
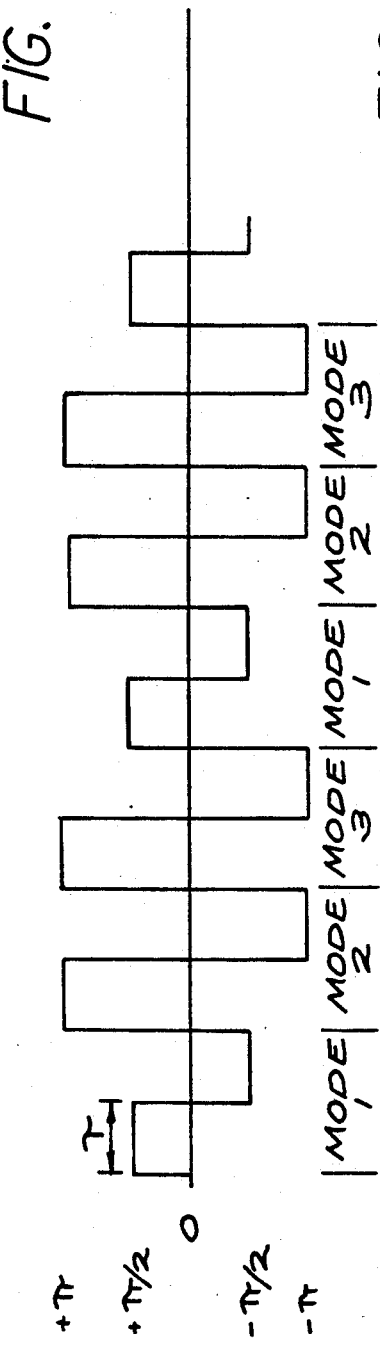
FIGS. 3(a), 3(b) and 3(c) are a series of waveforms that illustrate the phase modulation scheme for use in a triaxial fiber optic interferometer in accordance with the invention.
Figure 3B:
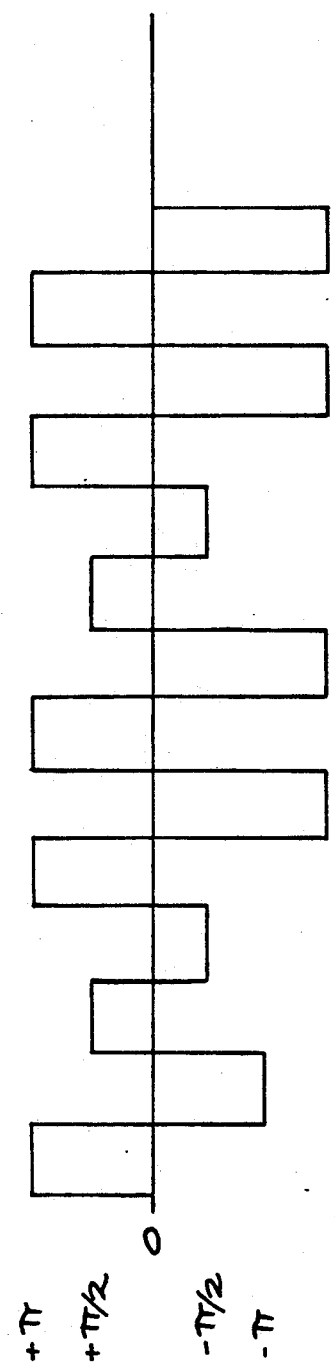
Figure 3C:
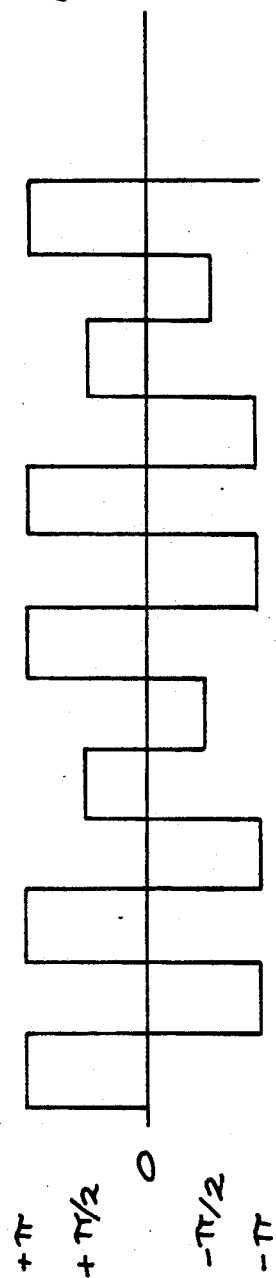

FIGS. 3(a), 3(b) and 3(c) are a set of waveforms that illustrate the phase modulation scheme for a triaxial fiber optic interferometer in accordance with the invention. The pattern of FIG. 3(a) corresponds to the applied phase shift or difference imposed by the phase shifter 14' between the gyros' two counterpropagating waves while the waveforms of FIGS. 3(b) and 3(c) correspond to the applied phase shifts or differences imposed by the phase shifters 16' and 18' respectively.

Changes in phase shifts for an axis being observed take place every $\tau$ time periods where $\tau$ corresponds to the time required for one wave to traverse the full length of the sensor coil. (It is assumed that this transit time for each of the gyroscopes 14, 16 and 18 is identical). The modulation time frame is divided into three distinct periods ("Mode 1", "Mode 2", and "Mode 3"). Each of the identified modes corresponds to a particular relationship between the phase differences superimposed by the phase shifters 14', 16' and 18'.

As can be seen, during the Mode 1 modulation period, a phase difference of $\pm \pi/2$ radians is artificially induced between the counterpropagating waves propagating within the coil 1 during two consecutive loop transit periods $\tau$. At the same time, phase differences of $\pm \pi$ are artificially applied to gyro axes 16 and 18. In Mode 2, phase differences of $\pm \pi/2$ are applied by the phase shifter 16' while phase differences of $\pm \pi$ are applied by the phase shifters 14' and 18'. In Mode 3, phase differences of $\pm \pi/2$ are applied by means of the phase modulator 18' while phase differences of $\pm \pi$ are applied by the phase shifters 14' and 16'. Alternatively, the $\pm \pi$ radian sequences of the blanking periods may be replaced with zero artificial phase shifts. This will result in overall simplification of the mechanism of the invention.

Referring to FIG. 2, it can be observed that the modulating phase biases imposed by the phase modulators 14', 16' and 18' alternately shift the operating points of the gyroscopes 14, 16 and 18 to regions of maximum sensitivity of combined beam intensity to phase difference ($\pm\pi/2$ phase difference) and regions of minimum sensitivity of combined beam intensity to phase difference (phase shift a multiple of $\pi$). Accordingly, comparing FIGS. 3(a), 3(b) and 3(c), it can be seen that the gyroscope 14 is biased to a point of maximum output beam sensitivity while the gyroscopes 16 and 18 are biased to points of minimum sensitivity during the period of time indicated as Mode 1. The gyroscope 16 is biased to maximum sensitivity during Mode 2 while the remaining gyroscopes are biased to minimum sensitivity and the gyroscope 18 is biased to maximum sensitivity during Mode 3 while, at the same time, the gyroscopes 14 and 16 are biased to minimum sensitivity. As can be seen, this pattern is repeated throughout.

Figure 4:
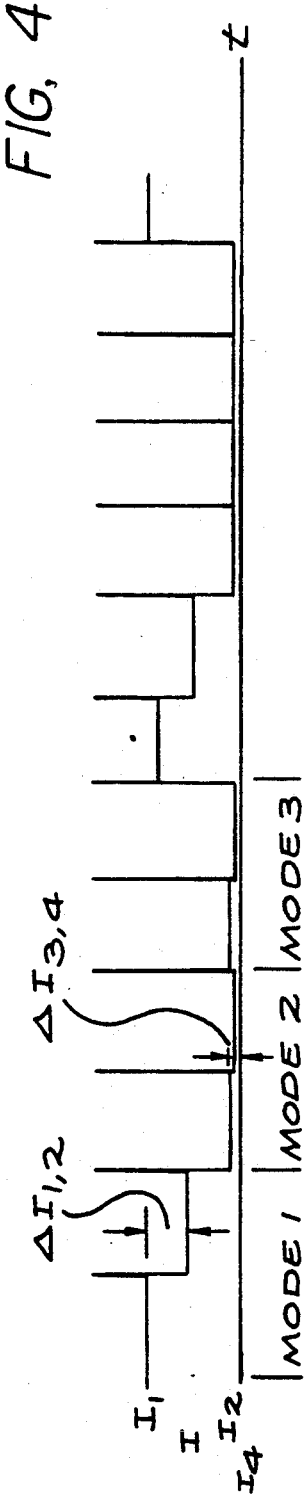
FIG. 4 is a graph of the relationship between the intensity and time for the output beam produced by the modulation scheme of FIG. 3(a)

FIG. 4 is a graph of the relationship between intensity and time for the output beam produced by the representative modulation scheme of FIG. 3(a). That is, the waveform of FIG. 4 represents the intensity of the combined beam from the gyroscope 14 as a function of time. As can be seen, during the first loop transit time $\tau$ of Mode 1, the output beam intensity is I1 (also indicated on the diagram of FIG. 2). This represents the intensity of the combined beam during the imposition of an artificial $\pi/2$ phase difference. This phase difference is present until both of the counterpropagating beams have been shifted by the same amount. (As mentioned earlier, the phase shifter 14' is positioned near one end of the gyroscope loop and, thus, for a period of time approximately equal to $\tau$, only one of the two counterpropagating beams undergoes a $\pi/2$ phase shift. At the end of $\tau$, the other counterpropagating beam also undergoes this phase shift and the net phase difference becomes zero. The gyroscope is said to be operating in a reciprocal mode when both beams have undergone the identical phase shift and are therefore in-phase. Referring to the diagram of FIG. 2, it is seen that a maximum intensity occurs at a zero phase difference. Accordingly, a spike is observed in the output of the gyroscope near the end of each loop transit time period $\tau$ as the two counterpropagating waves are momentarily in-phase producing corresponding peak intensity.

After $\tau$, the gyroscope returns to a reciprocal mode (same phase shift for both counterpropagating beams) and an opposite phase shift of $-\pi/2$ is imposed by the phase modulator 14'. A second intensity level $I_2$ is then observed. (For the purpose of illustration, it is assumed that some rotation, resulting in a nonreciprocal phase shift is occurring about the sensitive axis of the gyroscope 14 during the period in question.) Again, the output of the gyroscope 14 remains constant at a new level $I_2$ until the end of the loop transit time period $\tau$ and the output spikes up to a maximum value at the end of that period. It is known that the rate of rotation detected during the period of $\pm\pi/2$ modulation bias is a function of the difference between $I_2$ and $I_1$; That is $\Delta\phi = f(\Delta I_{1,2})$.

During the times indicated as Mode 2 and Mode 3, lower levels of intensity $I_3$ and $I_4$ are observed as can be confirmed by reference to FIG. 2. Furthermore, the difference between the two intensity levels, $\Delta I_{3,4}$ is considerably less than $\Delta I_{1,2}$ as a consequence of the substantially flatter contour of the intensity curve in the regions of $\pm\pi$ than in the regions of $\pm\pi/2$.

Figure 5:
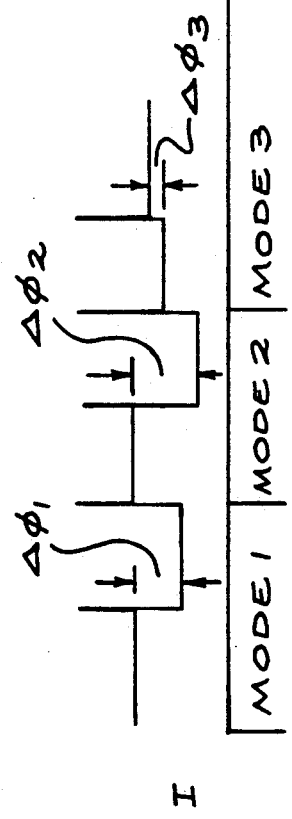
FIG. 5 is a graph of the intensity of the output of the triaxial interferometer of the invention as a function of time.

FIG. 5 is a graph of the intensity of the output of the triaxial interferometer (due to the contributions of all three interferometers) of the invention as a function of time. This graph, representing the output observed at the photodetector 12, comprises a summation of the outputs of the gyroscopes 14, 16 and 18. The command circuit 20 synchronizes the timing of the signal applied to the phase shifters as shown in FIGS. 3(a), 3(b) and 3(c) so that proper phasing takes place as defined by Modes 1, 2 and 3. The composite output as shown in FIG. 5 presents essentially the output of each of the gyroscopes taken during the time that it is experiencing a bias of $\pm\pi/2$. Of course, the output is not exactly equal to a series of outputs, each of which is strictly limited to the output of a single gyroscope. Rather, a small amount of signal is always contributed by the two "blanked" gyroscopes due to the superposition of outputs that occur in the portion of the network 22 comprising the bidirectional couplers 24, 30 and 32. However, as can be seen from FIG. 4, for low rotation rates, the contributions made by the blanked gyroscopes are considerably smaller than that of the "active" gyroscope during any given mode. Thus, the output of the triaxial interferometer can be seen to comprise an easily-interpreted series of substantially individual gyro outputs. Modifying the command circuit to allow a closed loop nulling technique can further minimize the cross-axis influence of the interferometers as well as increase the dynamic rang of rotational rate measurement for high rates.

Thus, it is seen that the present invention provides an economical triaxial Sagnac interferometer that is suitable for low accuracy applications such as artillery and the like. By employing the teachings of this invention, one may obtain a three-axis system that enjoys reduced energy consumption and size due to the need for only a single source of optical energy and a single photodetector. While this invention has been described with reference to its presently preferred embodiment, it is not limited thereto. Rather, this invention is limited only insofar as defined by the following set of claims and includes all equivalents thereof within its scope.

What is claimed is:

1. A triaxial fiber optic Sagnac interferometer for measuring rotation rates about three axes comprising, in combination:

a) a source of optical energy;
   b) a first, a second and a third gyroscope for measuring rotation rates about a first, a second and third axis respectively;
   c) each of said gyroscopes comprising a coil of optical fiber;
   d) means for launching said optical energy into each of said coils as counterpropagating waves;
   e) phase modulators located in each of said coils for artificially modulating the phase difference between said counterpropagating waves;
   f) a single detector for receiving the outputs of each of said gyroscopes;
   g) an optical network for receiving the output of said source, distributing said output to said gyroscopes, receiving the output of said gyroscopes and transmitting said outputs to said single detector; and
   h) means for driving said phase modulators so that the outputs of said gyroscopes are distinguishable at said detector, said means including means for modulating said gyroscopes in accordance with three mutually out-of-phase modulation sequences, each of said modulation sequences comprising a measuring period and two blanking periods.

2. An interferometer as defined in claim 1 wherein each of said periods is of equal duration.

3. An interferometer as defined in claim 2 further characterized in that:
   a) said measuring periods comprise alternating, equal periods of integral multiples of $+\pi/2$ radians and $-\pi/2$ radians; and
   b) said blanking periods comprise alternating, equal periods of integral multiples of $+\pi$ radians and $-\pi$ radians.

4. An interferometer as defined in claim 3 wherein each of said periods is equal to the gyro coil transit time.

5. An interferometer as defined in claim 4 wherein:
   a) said measuring sequence comprises $\pm\pi/2$ radians; and
   b) said blanking sequence comprises $\pm\pi$ radians.

6. An interferometer as defined in claim 2 wherein said means for driving said phase modulators comprises a central processor.

7. An interferometer as defined in claim 6 wherein said optical network includes means for combining the outputs of said gyroscopes into a single optical signal.

8. An interferometer as defined in claim 7 wherein said optical network comprises a plurality of bidirectional couplers.

9. A triaxial fiber optic Sagnac interferometer for measuring rotation rates about three axes comprising, in combination;
   a) a source of optical energy;
   b) a first, a second and a third gyroscope for measuring rotation rates about a first, a second and a third axis respectively;
   c) each of said gyroscopes comprising a coil of optical fiber;
   d) means for launching said optical energy into each of said coils as counterpropagating waves;
   e) phase modulators located in each of said coils for artificially modulating the phase difference between said counterpropagating waves;
   f) a single detector for receiving the output of each of said gyroscopes;
   g) an optical network for receiving the output of said source, distributing said output to said gyroscopes, receiving the output of said gyroscopes and transmitting said outputs to said single detector; and
   h) means for driving said phase modulators with three mutually out-of-phase modulation sequences of common frequency so that the outputs of said gyroscopes are distinguishable at said detector.

* * * * *